Patented Mar. 7, 1933

1,900,295

UNITED STATES PATENT OFFICE

REX DE ORE McDILL, OF RIVERSIDE, CALIFORNIA, ASSIGNOR TO FOOD MACHINERY CORPORATION, OF SAN JOSE, CALIFORNIA, A CORPORATION OF DELAWARE

PROCESS OF TREATING FRUIT FOR THE MARKET

No Drawing.    Application filed October 26, 1929. Serial No. 402,797.

This invention relates to a preservative coating and a process of treating fresh fruit and vegetables for the market and refers particularly to the treatment of citrus and similar fruits for the purpose of retarding shrinkage of the fruit.

Citrus fruit is frequently treated with alkali washing solutions and various solutions of preservative disinfecting agents before it is sent to the market. After the treatment with the washing material and the preservative agent, when it is used, the fruit is then usually dried and a coating of material such as wax or other equivalent covering agent is applied to the fruit for the purpose of retarding evaporation and preventing the fruit from shrinking. Difficulty is experienced in applying the wax-like coating on the dry fruit since an excess of the coating material is to be avoided because an excess of the coating material is found undesirable for the reason that the fruit cannot properly breathe.

It is the general object of the present invention to provide a process of treating fruit in which a wax-like substance may be applied to the fruit in a cold process and in which the wax-like substance may be more evenly distributed upon the fruit in a more simple manner. It is also an object of the present invention to provide a process in which a wax-like material may be placed upon the fruit while the fruit is still wet, thereby eliminating the necessity of first drying the fruit, and a further object of the invention is to provide a process in which the application of the wax-like material may be carried out cojointly or simultaneously with the application of the disinfecting material or mold retarding agent.

In accordance with the present invention, it has been found that fruit may be covered with a wax-like material by dissolving the wax-like material in a solvent and agitating the fruit with said solution of wax-like material in the presence of water or aqueous solution. By conducting the coating operation in this way the solution of wax-like material is broken up into fine particles through its agitation in the presence of water or an aqueous solution and it is applied to th fruit in a subdivided form, and any desired amount of the coating material may be applied to the fruit in this manner and even distribution of the same attained.

In accordance with the preferred form of the invention use is made of a solution of wax-like coating material which is heavier than the water or aqueous solution with which the solution of wax-like material is agitated, so that the tendency of the solution is to sink to the bottom of the agitating tank. This has the effect of retarding to a large extent unnecessary evaporation of the solvent employed. Moreover, when fruit is contacted with an agitated mixture of water or an aqueous solution and a wax-like substance with a solvent forming a fluid non-miscible with the aqueous phase and one which is heavier than the aqueous phase, the coating solution works its way towards the skin of the fruit when the fruit is placed in this agitated mixture and as the fruit is withdrawn from the agitated mixture the water of the mixture is found at the top of the fruit where it is easily brushed off, leaving solely the coating solution.

Another feature of the present invention is that the aqueous phase which is agitated with a non-miscible solution of the wax-like material may be a solution of any suitable disinfecting material, such as boro-glyceride, borax, hypochlorites, etc. Thus, the application of the covering agent may go hand-in-hand with the disinfecting of the fruit from mold spores.

While I have herein referred to the use of a material of wax-like nature, I have intended by such term to include any covering agent which has similar shrinkage retarding properties to wax when it is applied to fruit and included under the head of material of wax-like nature, not only various waxes but some viscous oils, paraffin, hydrogenated oils, vaseline and the like.

The present invention, together with various objects and advantages thereof will best be understood from the description of a preferred form or example of the process embodying the invention. For this purpose I have hereinafter described a preferred example of the invention.

In the preferred example of the invention, fruit, such as citrus fruit, is first put in a soaking tank where the scale, dust, etc. are loosened up. This soaking tank may comprise an aqueous solution of mold retarding substance. The soaking solution may also include various alkali washing materials, such as soap and washing powders. From the soaking tank the fruit is then brushed with or without the application of further washing materials and with or without the rinsing of any washing compounds from the fruit co-jointly with the brushing operation.

The fruit, after it has been suitably cleaned in this manner, is then passed into a tank where it is treated with a coating solution. As a preferred coating solution I employ paraffin dissolved in sufficient carbon tetrachloride so that the resulting solution is heavier than water or other aqueous phase used together with the coating solution in said tank. In addition to the solution of coating material in the tank there is included an aqueous phase which may be merely water in some cases, but preferably comprises a solution of a mold retarding agent such as borax, hypochlorite, boro-glyceride or the like.

While I have mentioned the use of a wax, it is to be understood that other materials of similar nature may be employed and that various solvents may be substituted for carbon tetrachloride. The aqueous phase may also include glycerine or alcohol. The relative proportions of said aqueous phase and the solution of covering in the tank will depend to an extent upon the particular solutions used and upon the extent of wax-like coating which it is desired to apply to the fruit. The aqueous solution and the solution of coating material are agitated together in the tank while the fruit is passing through the tank by being suitably submerged therein. As the fruit passes through the tank the coating solution adheres to the fruit and is applied to the fruit in the form of fine driblets which adhere to the fruit.

The application of this mixture of aqueous phase agitated with a solution of a coating material to the fruit may go hand-in-hand with an operation of brushing the fruit while it is submerged. Hand brushing may be employed but I prefer to employ in this tank a disc lemon washer, such as is now in common use in the fruit packing art. When the fruit is brushed under or in the agitated mixture, drops of the coating solution are brushed against the fruit and cling to the same and are spread evenly over the entire surface, except the calyx or stem end of the fruit.

The calyx or button on the stem of the fruit is not coated or sealed entirely as the brushes cannot reach the depth of the calyx. This is an advantage as the coating applied to the fruit does not entirely arrest the breathing or oxidation of the fruit which is essential to its best preserving properties.

The fruit is then passed to a brushing apparatus where the surplus water is knocked off the fruit and it is then passed to a drier where it is dried and then it may be handled in any desired or preferred manner. In the brusher, which may be of any usual or preferred type, the water or aqueous phase which was in the treating tank is rapidly knocked off from the fruit since the coating solution adheres to the fruit in a better manner than the aqueous phase. This is particularly true where the aqueous phase is lighter than the coating solution.

As examples of other solutions, chloroform, acetylene tetrachloride, petroleum, cold tar distillates and various mixtures may be used.

An advantage of the present invention is that the fruit is in constant contact with a mold retarding agent until the coating is applied to the fruit. Moreover, there is no heating of the fruit required in applying the coating substance. This is an advantage for the reason that a number of mold spores are more active at high temperatures than at low temperatures.

Another advantage of the invention is that while the solution is employed there is a minimum of evaporation of the solvent and no solvent is evaporated in the process except that constituting part of the film of coating solution applied to the fruit. Where wax-like materials are applied to the fruit by a solvent, there is ordinarily a large evaporation of solvent and a considerable quantity of the wax-like substance is applied as solid particles to the fruit where it is not particularly effective as a coating composition.

Another advantage of the present invention is that it has been found that the fruit which is coated with a wax-like material under water will dry more rapidly and thoroughly because of the surface tension of the aqueous solution having been reduced and the globules of water adhering to the fruit are easily knocked off by the brushing means.

Carbon tetrachloride and acetylene chloride are of particular value as solvents, either by themselves or in mixtures with other materials, since they are non-inflammable. This is true even when the carbon tetrachloride is admixed with a suitable quantity of other solvent which by itself is inflammable.

While the particular process herein described is well adapted to carry out the objects of the present invention, it is to be understood that various modifications and changes may be made without departing from the invention and the invention includes all such changes and modifications as come within the scope of the appended claims.

I claim:

1. A process of preserving fruit which consists in contacting the fruit in an agitated mixture of an aqueous phase and a solution of wax-like material which solution is heavier than the aqueous phase.

2. A process of preserving fruit which consists in contacting the fruit with an aqueous solution of a mold retarding agent and a solution of a wax-like material which solution is heavier than the aqueous solution, the two solutions being agitated together in the presence of the fruit.

3. A process of preserving fruit which consists in contacting the fruit with an aqueous solution of a mold retarding agent and a solution of a wax-like material which solution is heavier than the aqueous solution, the two solutions being agitated together in the presence of the fruit, and brushing the fruit while in contact with said solutions.

4. A process of preserving fruit which consists in contacting the fruit with an aqueous solution of a mold retarding agent and a solution of a wax-like material which solution is heavier than the aqueous solution, the two solutions being agitated together in the presence of the fruit, removing the fruit from such solutions and brushing the same to distribute the coating material and to brush off the surplus aqueous material.

5. A process of preserving fruit which consists in contacting the fruit with an aqueous solution of a mold retarding agent and a solution of a wax-like material which solution is heavier than the aqueous solution, the two solutions being agitated together in the presence of the fruit, brushing the fruit while in contact with said solutions, then removing the fruit in contact with said solution and further brushing the same for distributing the coating material and for brushing the excess aqueous phase therefrom.

6. A process of preserving fruit consisting of immersing the fruit in an aqueous liquor, said liquor having in suspension a solution of a solid hydrocarbon and carbon tetrachloride, which solution is of heavier gravity than the aqueous liquor.

7. A process of coating fruit consisting of contacting the fruit with a fluid coating medium and an aqueous phase immiscible with the fluid coating medium, the fluid coat medium being of greater specific gravity than the aqueous phase in which the same is suspended, brushing the fruit, and thereafter drying the fruit.

8. A process of preserving fruit consisting of submerging the fruit in an aqueous preserving solution having enzyme arresting properties and contacting the fruit while submerged with a coating solution consisting of carbon tetrachloride, paraffin, said solution being of greater specific gravity than the aqueous preserving solution, and rubbing the fruit while submerged to spread the coating over the fruit, then brushing the surplus aqueous solution from the fruit by brushing the fruit out of contact with the aqueous solution, and finally drying the fruit.

Signed at Los Angeles, California, this 19th day of October, 1929.

REX DE ORE McDILL.